June 26, 1951 N. E. HART 2,558,135
WEIGHING SCALE POISE
Filed Dec. 16, 1949
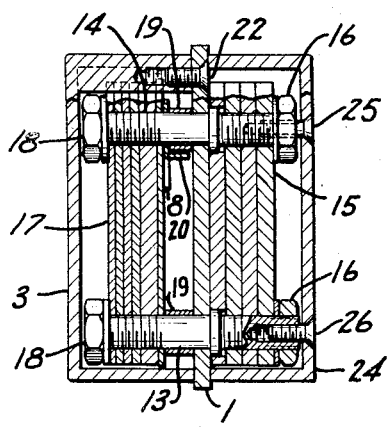
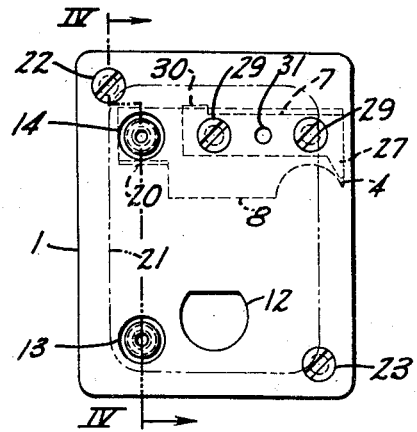
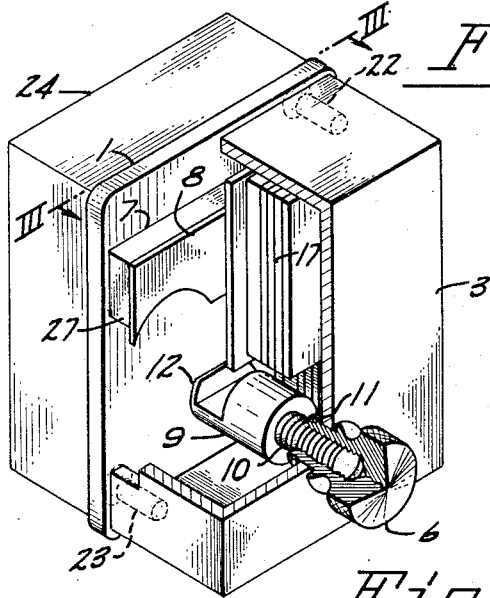
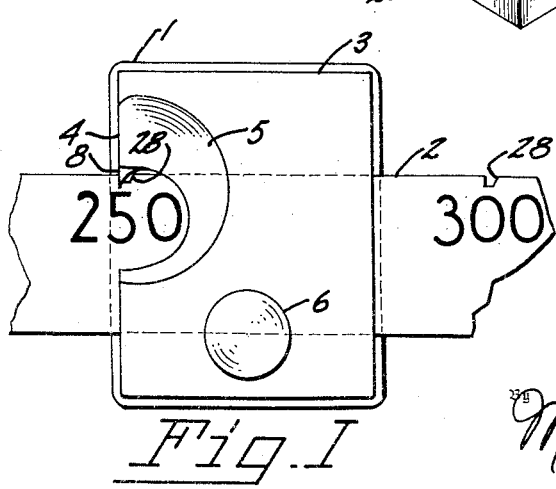
Inventor
Norman E. Hart
Marshall, Marshall & Leonard
Attorneys Patented June 26, 1951

2,558,135

UNITED STATES PATENT OFFICE 2,558,135

WEIGHING SCALE POISE

Norman E. Hart, Toledo, Ohio, assignor to Toledo Scale Company, Toledo, Ohio, a corporation of New Jersey Application December 16, 1949, Serial No. 133,458

4 Claims. (Cl. 265—56.5)

This invention relates to weighing scale poises and in particular to an improved construction for medium weight poises of industrial weighing scales.

Medium weight poises are ordinarily constructed of a pair of shell which when assembled slidingly embrace a beam on which they are mounted and which are provided with one or more pockets to receive the lead used to adjust the weight of the poise. Poises of this type are normally finished with lacquer and it is therefore necessary that the poises be adjusted for the scale for which they are to be used before the shells are painted or lacquered. The adjustment for weight of this type of poise is difficult because the usual method of pouring melted lead into a shell for adding weight to a finished poise spoils the paint or lacquer finish.

The principal object of this invention is to provide a weighing scale poise in which the lead in the form of slugs or washers is attached to a central plate rather than to the shells of the poise.

Another object of the invention is to provide an improved poise construction in which the wear and impact forces are taken on easily replaceable strong members rather than on the relatively weak shells of previously known poises.

A still further object of the invention is to provide an easily constructed weighing scale poise having no readily visible attaching means for securing the poise shells to a central mounting plate.

More specific objects and advantages are apparent from the following description of a preferred embodiment of the invention.

According to the invention the improved poise is constructed of a central plate having attached thereto means for supporting and clamping the plate to a weigh beam as well as means for mounting lead washers or similar weights and enclosing shells. This type of construction makes it possible to easily adjust the weight of the poise by adding or removing lead washers and since this operation is performed without the necessity of heating the poise the shells may be painted prior to assembly and adjusting thus making possible a more convenient production and assembly schedule.

An improved poise constructed according to the invention is illustrated in the accompanying drawings.

In the drawings:

Figure I is a front elevation of the improved poise and a fragment of a weigh beam supporting the poise.

Figure II is a partially broken away perspective view of the improved poise.

Figure III is a rear elevation of a central mounting plate of the improved poise taken along line III—III of Fig. II.

Figure IV is a vertical cross section taken substantially along the line IV—IV of Figure III.

The specific figures and the accompanying description are intended merely to illustrate the invention but not to impose limitations on the claims.

The improved poise comprises a mounting plate 1 that is supported parallel to and adjacent the rear face of a weigh beam 2 on which the poise is carried. A front shell 3, the sides of which are notched to fit over the weigh beam 2, is attached to the mounting plate 1. The shell 3 has in its left edge 4 a semi-circular "eye" opening 5 through which indicia on the weigh beam 2 may be read. A locking nut 6 extends forwardly from the lower central face of the shell 3 so that it may be easily manipulated to lock the poise in adjusted position.

Referring to Figure II, the plate 1 carries a formed block 7 that is adapted to ride on the top edge of the weigh beam 2 to support the poise. Next to the block 7 is a strip 8 the tip of which serves as an index pointer and the main part of which overlaps the front of the beam 2 to hold the mounting plate 1 closely adjacent the rear face of the beam 2. A lock for holding the poise in adjusted position on the beam 2 comprises a cylindrical piece 9 that is transversely notched to receive the lower edge of the beam 2 and that has a threaded extension 10 threadedly engaging a drilled and tapped hole in the hub of the locking nut 6. The locking nut 6 is journaled in a hole in the shell 3 and is provided with a snap ring 11 to prevent it from being unscrewed and removed from the poise. The cylindrical notched locking member 9 has its other end flattened off so that it may fit a D-shaped opening 12 cut in the mounting plate 1 to hold it from turning with the nut 6 as the nut is turned to tighten the notched section against the beam.

Referring to Figure IV, a pair of studs 13 and 14 are press fitted into holes drilled in the mounting plate 1 and extend laterally from each side of the mounting plate. A plurality of lead washers or slugs 15 are mounted on the studs 13 and 14 on the back side of the mounting plate 1 and are held in place by nuts 16 screwed onto the studs 13 and 14. A similar series of lead washers or slugs 17 are mounted on the studs 13 and 14 on the front side of the mounting plate 1 and secured by nuts 18 threaded onto the ends of the studs. These latter washers or slugs 17 are spaced by collars 19 from the mounting plate to allow room for the insertion of the beam 2. In addition the index strip 8 also is carried on the stud 14 and has a turned lip or shelf-like portion 20 that rides on the upper edge of the beam 2.

As may be seen in Figure II the plates 17 are relatively narrow so as not to interfere with the viewing opening or "eye" 5 formed in the shell 3. The plates 15 on the back side of the mounting plate 1 are not so limited and therefore are of a size to occupy substantially all the available space on the back side of the mounting plate 1. The outline of the plates 15 is indicated by the broken line 21 in Figure III.

The front shell 3 is provided with additional metal in two oppositely located corners and these corners are drilled and tapped to receive a pair of screws 22 and 23 which are inserted through holes in the mounting plate 1 and threaded into the drilled and tapped holes to secure the shell 3 in place.

Another shell 24 covering the plates 15 is attached by a pair of screws 25 and 26 that are inserted through countersunk holes in the back of the shell 24 and threaded into drilled and tapped holes in the ends of the studs 13 and 14. Thus after the poise is assembled the only fastening means that are visible are the heads of the screws 25 and 26 and these are on the back side of the poise which is normally adjacent the column or lever housing of the weighing scale and therefore are not ordinarily visible.

By making the mounting plate 1 slightly larger, in front elevation, than either of the shells 3 or 24 a decorative offset is formed thus making unnecessary any precise machining or positioning of the poise shells with respect to each other or the plate to eliminate an unsightly joint between the shells and the plate.

Since the poise may be used with either a smooth—continuously graduated—beam or with a notched beam, as illustrated, the block 7 is formed with a toe or point 27 as seen in Figures II and III to engage notches 28 in the beam 2. If the poise is to be used with a smooth beam a pair of screws 29 securing the block 8 to the mounting plate 1 are temporarily removed and the block 7 is turned end for end so as to present a flat section 30 to the upper surface of the beam. To facilitate this operation the block 7 is provided with a third hole 31 that is engaged by a raised point formed by striking with a punch the mounting plate 1 or the strip 8 carrying the index point. This engagement between the punched point and the hole 31 permits the block 7 to be easily spun about the hole 31 as an axis and lined up to receive the mounting screws 29.

The block 7 with either its toe end 27 or its flat section 30 receives all the shock produced by rapidly sliding the poise against a lock pin set in the beam or into one of the notches 28. However, this block may be made of steel so that it may withstand these shock forces without injury. Also, the poise on a weighing scale may often be slammed against stops at either end of its travel. In the improved poise, as shown in the drawings, the edges of the mounting plate 1 are arranged to strike the stops at either end of the beam and since this plate may be made of steel it can easily withstand rough usage without damage. In previous types of construction the poise shells themselves struck the stops and were often damaged. Since, for economy of manufacture, the shells were made of die castings that are relatively weak along the edges and unable to withstand rough usage without bending or breaking.

Various modifications in the details of construction of the improved poise may be made without departing from the spirit and scope of the invention or losing the advantages of the simple built-up construction illustrated in the drawings.

I claim:

1. In a poise for a weighing scale, in combination, a plate serving as a frame for the poise, a plurality of studs extending perpendicularly to each side of the plate, a plurality of slugs of heavy material mounted on the studs, spacers mounted adjacent the plate on the studs extending to one side of the plate, said spacers serving to space the slugs from the plate to allow the insertion of a weighbeam therebetween, and covers fitted over the studs and slugs and abutting the marginal area of the plate.

2. In a poise for a weighing scale, in combination, a plate serving as a frame for the poise, a plurality of studs extending perpendicularly to each side of the plate, spacers on the studs extending to one side of the plate, an auxiliary plate mounted on the studs and spaced from the first plate to allow the insertion of a weighbeam therebetween, a bar mounted on the first plate to bear on the top of the weighbeam, a plurality of slugs mounted on the studs to weight the poise, and a pair of covers enclosing the studs and slugs and abutting the marginal area of the plate.

3. In a poise for a weighing scale, in combination, a plate serving as a frame for the poise, a plurality of studs extending from the sides of the plate, spacers on some of the studs, a plurality of slugs mounted on the studs to provide weight for the poise, said spacers serving to space the slugs on one side of the plate to allow the passage of a weighbeam therebetween, a cover that is fitted over the slugs and that is notched to receive the weighbeam, at least one screw extending through the plate and threaded into the notched cover to secure the cover to the plate, and a second cover fitted over the slugs on the other side of the plate, and screws passing through the second cover and threaded into the studs covered by the second cover.

4. In a poise for a weighing scale, in combination, a plate serving as a frame for the poise, a plurality of studs extending from each side of the plate, spacers mounted on some of the studs, an auxiliary plate mounted on the studs and spaced from the first plate to receive a weighbeam therebetween, a plurality of slugs of heavy material mounted on the studs on either side of the plate, covers for enclosing the slugs, and a clamp comprising a notched member fitted over an edge of the weighbeam, said member having a non-circular end fitted into a mating hole in said plate, and a screw for drawing said member relative to the poise to clamp the weighbeam against a side of the notch in said member.

NORMAN E. HART.

No references cited.